B. E. ROSCOE.
THERMAL PAN.
APPLICATION FILED JAN. 22, 1913.

1,103,159.

Patented July 14, 1914.

Witnesses
L. Huber.
F. S. Langford.

Inventor
Burton E. Roscoe.
by
Lloyd Blackmore Atty.

UNITED STATES PATENT OFFICE.

BURTON E. ROSCOE, OF SPRINGHILL, NOVA SCOTIA, CANADA.

THERMAL PAN.

1,103,159.

Specification of Letters Patent.

Patented July 14, 1914.

Application filed January 22, 1913. Serial No. 743,577.

*To all whom it may concern:*

Be it known that I, BURTON E. ROSCOE, a subject of the King of Great Britain, and resident of Springhill, in the Province of Nova Scotia, Dominion of Canada, have invented certain new and useful Improvements in Thermal Pans, of which the following is a specification.

The invention relates to improvements in thermal pans, as described in the present specification, and illustrated in the accompanying drawings that form part of the same.

The invention consists essentially of the novel arrangement and construction of parts whereby a pan is provided with inner and outer peripheral rings to form an insulating joint and support for an inner pan.

The objects of the invention are to increase the efficiency of thermal pans, whereby food stuffs placed in the inner pan may be maintained at the same temperature in a simple manner and by inexpensive means.

Figure 1:
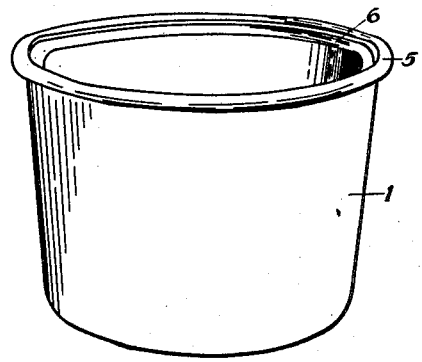
Figure 2:
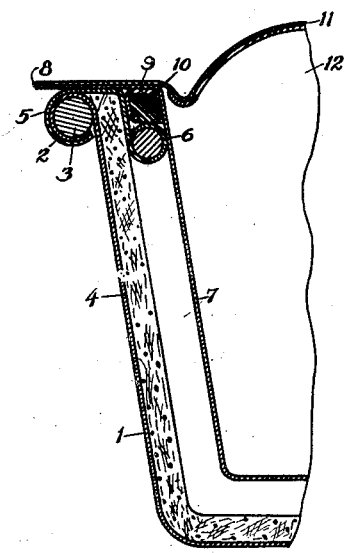
Figure 3:
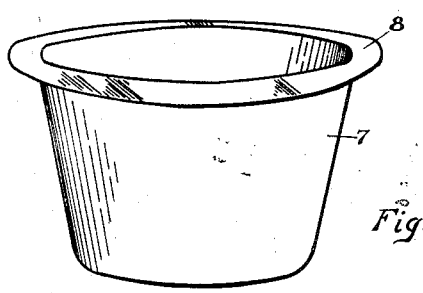

In the drawings, Figure 1 is a perspective view of the outer pan. Fig. 2 is an enlarged sectional view of a section of the pans at the edge thereof. Fig. 3 is a perspective detail view of the inner pan.

Like numerals of reference indicate corresponding parts in each figure.

Referring to the drawings, 1 is the outer pan having the curled edge 2 with the filling wire 3 forming a substantial rim.

4 is a lining of asbestos or similar material about the entire inner wall and bottom of the pan 1 for insulating purposes.

5 is a rim strip having the outer edge thereof curled about the curled rim 2 of the pan 1, and the inner edge thereof extending over and clamping the top of the lining 4 about the edge of the pan 1, and curled upwardly about the wire filler-piece 6 to form a ring or ledge about the interior edge periphery of the pan 1.

7 is the inner pan having the wire flange 8 about the edge thereof.

10 is a gasket or filler strip of insulating material, such as rubber or cork, fitting under the flange 8 between the strip 9 and the wall of the inner pan 7, and resting upon the inner ring 6, and forming an air-tight joint.

11 is a cover fitting the inner pan 7, and having a lining 12 of asbestos or similar material covering the entire under side of said cover for insulating purposes.

In using the pan food stuffs may be placed in the inner pan 7, the lid 11 fitted thereon, and the pan 7 then placed within the outer pan 1, the gasket or filler-piece 10 forming an air-tight joint around the edge, whereby an absolutely dead-air space is formed between the inner and outer pans, and in this manner an excellent non-conducting wall is formed, whereby food stuffs within the inner pan, if placed therein in a hot condition, will remain hot for several hours, or if cold, will remain in a cool state for several hours.

It must be understood that the inner ring 6 may be formed in many ways, and it is not absolutely necessary to have the rim strip 5 formed as shown and described, and I do not wish to be confined to the exact arrangement as shown and described in the present specification.

What I claim as my invention is:

A thermal pan comprising an outer pan having a lining of insulating material and a reinforcing ring about the outer peripheral edge thereof, a rim strip extending from said reinforcing ring toward the interior of said pan over said insulating lining and having a reinforcing ring circular in cross section secured about the inner edge thereof, an inner pan suspended within said outer pan and having a flange extending outwardly from the edge thereof over the edge of said outer pan and a retaining strip extending downwardly therefrom and a filler strip secured on the under side of said flange between said inner pan and said retaining strip and resting upon said inner reinforcing ring and a cover fitting said inner pan and having a lining of insulating material.

Signed at Springhill Nova Scotia this 18th day of November 1912.

BURTON E. ROSCOE.

Witnesses:
J. M. APPLETON,
EDWIN JONES.